United States Patent
Enomura

(10) Patent No.: US 12,533,651 B2
(45) Date of Patent: Jan. 27, 2026

(54) FLOW REACTOR

(71) Applicant: M. Technique Co., Ltd., Izumi (JP)

(72) Inventor: Masakazu Enomura, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 908 days.

(21) Appl. No.: 17/782,556

(22) PCT Filed: Dec. 20, 2019

(86) PCT No.: PCT/JP2019/050217
§ 371 (c)(1),
(2) Date: Jun. 3, 2022

(87) PCT Pub. No.: WO2021/124583
PCT Pub. Date: Jun. 24, 2021

(65) Prior Publication Data
US 2023/0011329 A1   Jan. 12, 2023

(51) Int. Cl.
*B01J 19/24* (2006.01)
*B01J 19/00* (2006.01)
*F28D 7/10* (2006.01)

(52) U.S. Cl.
CPC ......... *B01J 19/243* (2013.01); *B01J 19/0013* (2013.01); *B01J 2219/00081* (2013.01);
(Continued)

(58) Field of Classification Search
CPC .................. B01J 19/243; B01J 19/0013; B01J 2219/00081; B01J 2219/0209;
(Continued)

(56) References Cited

U.S. PATENT DOCUMENTS

| 2,374,609 A | 4/1945 | McCollum |
| 2,456,775 A | 12/1948 | Fausek et al. |

(Continued)

FOREIGN PATENT DOCUMENTS

| CN | 1561448 A | 1/2005 |
| CN | 1909959 A | 2/2007 |

(Continued)

OTHER PUBLICATIONS

CN-102325587 A—machine translation (Year: 2025).*

(Continued)

*Primary Examiner* — Huy Tram Nguyen
(74) *Attorney, Agent, or Firm* — Birch, Stewart, Kolasch & Birch, LLP

(57) ABSTRACT

A flow reactor can promote a reaction under appropriate temperature management, can precent reaction fluid or generated gas from being trapped in a heat transmission part, can be disassembled for easy cleaning, and to which a coating or lining can be applied. This flow reactor is provided with two flow paths, a reaction flow path and a second flow path, in a space formed between an inner cylinder and an outer cylinder that are concentric. A spiral heat transmission body is disposed between the inner cylinder and the outer cylinder, and the spiral heat transmission body has a substantially triangular cross-sectional shape in an axial cross-sectional view. The spiral heat transmission body partitions the space into the reaction flow path and the second flow path, and heat is exchanged via the spiral heat transmission body between a reaction fluid F1 flowing through the reaction flow path and a heat medium F2 flowing through the second flow path.

20 Claims, 4 Drawing Sheets

(52) U.S. Cl.
CPC ............... *B01J 2219/0209* (2013.01); *B01J 2219/0218* (2013.01); *B01J 2219/0245* (2013.01)

(58) Field of Classification Search
CPC ........ B01J 2219/0218; B01J 2219/0245; B01J 19/006; B01J 2219/00083; B01J 2219/0009; B01J 2219/00094; B01J 19/0053; B01J 19/24; B01J 19/244; F28D 7/026; F28D 7/10; F28D 2021/0022
USPC ........................................................ 422/200
See application file for complete search history.

(56) References Cited

U.S. PATENT DOCUMENTS

| | | | |
|---|---|---|---|
| 2,993,682 | A | 7/1961 | Huet |
| 3,332,446 | A | 7/1967 | Mann |
| 5,148,861 | A | 9/1992 | Colvin et al. |
| 5,964,278 | A | 10/1999 | Langoy et al. |
| 6,220,344 | B1 | 4/2001 | Beykirch et al. |
| 2005/0031507 | A1 | 2/2005 | Mae et al. |
| 2008/0315117 | A1 | 12/2008 | Kauling et al. |
| 2010/0307726 | A1 | 12/2010 | Chiu et al. |
| 2012/0152508 | A1 | 6/2012 | Holl |
| 2014/0311612 | A1 | 10/2014 | Höglund |
| 2015/0165408 | A1 | 6/2015 | Zmierczak et al. |
| 2015/0300746 | A1 | 10/2015 | Takinami et al. |
| 2018/0259266 | A1 | 9/2018 | Enomura |

FOREIGN PATENT DOCUMENTS

| | | | | |
|---|---|---|---|---|
| CN | 102325587 | A | * 1/2012 | ........... C04B 35/565 |
| CN | 102472594 | A | 5/2012 | |
| CN | 104023837 | A | * 9/2014 | ............. B01J 19/24 |
| JP | 9-512894 | A | 12/1997 | |
| JP | 2000-297991 | A | 10/2000 | |
| JP | 2001-201275 | A | 7/2001 | |
| JP | 2005-46652 | A | 2/2005 | |
| JP | 2008-134003 | A | 6/2008 | |
| JP | 2012-529626 | A | 11/2012 | |
| JP | 2015-502842 | A | 1/2015 | |
| JP | 2016-102643 | A | 6/2016 | |
| JP | 2019-7649 | | 1/2019 | |
| KR | 10-2004-0047994 | A | 6/2004 | |
| WO | WO 03/029744 | A3 | 4/2003 | |
| WO | WO 2005/068062 | A1 | 7/2005 | |

OTHER PUBLICATIONS

CN-104023837 A—machine translation (Year: 2025).*
Extended European Search Report dated Aug. 9, 2023 for Application No. 19956523.5.
International Search Report for PCT/JP2019/050217 (PCT/ISA/210) mailed on Apr. 14, 2020.

* cited by examiner

FLOW REACTOR

TECHNICAL FIELD

The present invention relates to a flow reactor, especially a flow reactor provided with a reaction flow path spirally circulated to flow a fluid to be reacted.

BACKGROUND ART

In the processes for manufacturing a chemical and a drug as well as in the reaction processes of a toner, an inkjet, and the like, there are many demands such as those for rapid cooling or heating, precise temperature control, and so forth. In addition, there are demands to reduce the required installation space as much as possible and to downsize the equipment itself, and there is demand for higher performance. Further, the flow reactor with less adhesion, excellent washability, pressure resistance, corrosion resistance, and a low cost is required.

In the past, as disclosed in Patent Document 1, a shell-and-tube type reactor having a plurality of stages has been known. This reactor comprises at least two types of regions, which contribute to removal of a heat from a system or supply of a heat to a system in accordance with the request from the system. The reactor is provided with a group of reaction regions, which are equipped with a catalyst to facilitate a reaction, and at the same time, with a tube to remove or supply a heat.

However, in any one of described in Patent Document 1, when an adhesion or the like occurs in the tube, not only cleaning thereof is difficult, but also the cleaning state such as whether or not cleaning is done cannot be readily confirmed.

In addition, since the amount of the heat medium held in the shell side is so large that overshoot and undershoot can readily occur, and it is basically a classical heat exchanger, thus, it is difficult to dramatically increase an overall heat transfer coefficient thereof. Further, since the tube is attached to a tube sheet, it is difficult to use this for the reaction that repeats expansion and contraction by heat. In addition, it is substantially impossible to apply coating or lining to inside of the narrow heat transfer tube, and due to its structure, also in the other flow paths, it is difficult to apply coating or lining with a corrosion resistant material; therefore, in view of the corrosion resistance and the like, improvements thereof are required. Especially, it is substantially impossible to apply coating or lining to inside the heat transfer tube with a corrosion resistant material, and even if this could be done, mass production thereof is poor so that this is inevitably non-practical from a viewpoint of the cost thereof.

Patent Document 2 describes a microreactor in which a plurality of supply paths of fluids is merged to one reaction flow path, whereby a reaction is conducted while passing these fluids through the reaction path. Here, the reaction flow path is formed as a spiral flow path by cutting a spiral screw on either of an outer peripheral surface of a core member on a round rod and an inner peripheral surface of an outer tube member having an inner peripheral surface that is a circular cross-sectional shape to tightly fit the outer peripheral surface of the core member and the inner peripheral surface of the outer tube member. However, the heat transfer area thereof is so small that the screw-like wall surface formed by much work cannot be used as the direct heat transfer surface; thus, this lacks the viewpoint of reducing the heat transfer resistance essential for a flow reactor as much as possible and increasing the overall heat transfer coefficient. In addition, it is specialized for the microreactor used for a reaction of very small quantity; thus, it is not designed for the equipment aiming to increase its size. Accordingly, it is difficult to be up-scaled; and even if the size could be increased as it is, not only there are many problems such as decomposability and washability, etc., but also the precise temperature control and the like cannot be realized.

Patent Document 3 describes a tubular flow module that is provided with at least two concentric tubes having spiral characteristics. In this module, an inner tube is coaxially arranged inside of an outer tube, a maximum diameter of the inner tube is larger than a minimum diameter of the outer tube, and a space between the inner tube and the outer tube is a flow path of a fluid. The outer and inner tubes having the spiral characteristics are engaged like a screw and a nut; and because the spiral characteristics acts like a screw, this is a tubular module having a screw-like fitting. The tubular module has an average flow direction in an axial direction thereby generating an improved plug flow condition (see, paragraph 00018 in the Patent Document). Accordingly, in the tubular flow module of Patent Document 3, a counter-current flow of a spiral flow is not possible; thus, similarly to Patent Document 2, not only this is unsuitable for an increasing in size, but also a precise temperature control is difficult.

CITATION LIST

Patent Documents

Patent Document 1: Japanese Patent Application Laid-Open Publication No. 2012-529626
Patent Document 2: Japanese Patent Laid-Open Publication No. 2005-46652
Patent Document 3: Japanese Patent Application Laid-Open Publication No. 2015-502842

DISCLOSURE OF INVENTION

Problems to be Solved by the Invention

In view of the circumstances described above, an object of the present invention is to provide a flow reactor that can facilitate a reaction process of a fluid to be reacted under an appropriate temperature control, namely in the state that the temperature of the fluid to be reacted is controlled.

Another object of the present invention is to provide a flow reactor that can facilitate a reaction thereby reducing a reaction time.

Still another object of the present invention is to provide a flow reactor having a structure suitable for suppressing retention of a fluid to be reacted or a generated gas in a heat transfer portion.

Still another object of the present invention is to provide a flow reactor having good washability.

Still another object of the present invention is to provide a flow reactor that can be decomposable.

Still another object of the present invention is to provide a flow reactor capable of applying coating or lining.

Means for Solving the Problems

According to the present invention, a flow reactor is provided with a reaction flow path that spirally circulates to flow a fluid to be reacted, in which a heat transfer body is arranged in a space formed between an inner tube and an outer tube that are arranged concentrically; the heat transfer body is spirally circulated and has a cross sectional-shape of a substantially triangle in an axial-direction cross sectional-view; and the space is partitioned into the reaction flow path and a second flow path by the heat transfer body, and a heat exchange is performed between the fluid to be reacted flowing in the reaction flow path and a heat medium flowing in the second flow path via the heat transfer body.

According to the present invention, a flow reactor is provided with a reaction flow path that spirally circulates to flow a fluid to be reacted, in which a heat transfer body that spirally circulates is arranged in a space formed between an inner tube and an outer tube that are arranged concentrically; the flow reactor is configured such that the space is partitioned into the reaction flow path and a second flow path by the heat transfer body, and a heat exchange is performed between the fluid to be reacted flowing in the reaction flow path and a heat medium flowing in the second flow path via the heat transfer body; the inner tube, the outer tube, and the heat transfer tube are assembled so as to be separable into a side of the outer tube and a side of the inner tube; and in the state of being separated into the side of the outer tube and the side of the inner tube, a flow path constitution surface that defines the reaction flow path is separated into the side of the outer tube and the side of the inner tube, and whole surfaces of the flow path constitution surfaces that define the reaction flow path is configured so as to be directly exposed without being hidden by any other portion when viewed from the radius direction, which is perpendicular to the axial direction.

It is appropriate that at least any one of the inner tube and the outer tube is a circular cylinder in an axial-direction cross-sectional view thereof. By so doing, a countercurrent flow of spiral flow can be generated in the fluid to be reacted flowing through the reaction flow path which is defined by the heat transfer body having the substantially triangular shape in the cross-sectional view thereof and the inner tube or the outer tube.

In addition, it is appropriate that a ratio ($\lambda/\mu$) of a maximum flow path width ($\lambda$) of the reaction flow path to a minimum flow path width ($\mu$) of the reaction flow path in a radius direction is preferably 2 or more ($2<\lambda/\mu<\infty$). By so doing, the flow toward a spiral direction in the inner tube or the outer tube can be made greater than the flow toward an axial direction; thus, as a whole, the flow direction of the fluid to be reacted can be made toward the spiral direction.

In addition, the present invention may be carried out such that the heat transfer body is fixed to any one side of the outer tube and the inner tube, and not to any other side of the outer tube and the inner tube, and the heat transfer body has a sterically shaped portion having at least one bending portion and capable of forming a space through which fluids can flow in both the inner surface side and the outer surface side thereof; and an exterior angle of all bending portions in the flow path constitution surface that defines the reaction flow path is 90 degrees or greater.

In addition, the present invention may be carried out such that the reaction flow path is not provided with a horizontal portion where the fluid to be reacted possibly retain.

In addition, the present invention may be carried out such that the reaction flow path and the second flow path are spirally circulated, and there is either no gap or there is a gap of 4 mm or less in a radius direction between the circulations adjacent to each other in an axial direction.

In addition, the present invention may be carried out such that in an axial-direction cross-sectional view of the reaction flow path and the second flow path, a cross sectional shape thereof is a substantially triangle whose apex angle $\theta$ is in the range of 30 degree or more and 125 degree or less.

In addition, the present invention may be carried out such that the side of the inner tube and the side of the outer tube are assembled so as to be separatable by only moving in an axial direction without rotating, and the heat transfer body is configured not to interfere with other portion when moving in the axial direction.

In addition, the present invention may be carried out such that in the reaction flow path and the second flow path, a cross sectional shape thereof in an axial-direction cross-sectional view is a substantially triangle including two slopes, a bottom surface, and a peak portion; and an axial-direction length (a) of the peak portion is shorter than an axial-direction length (b) of the slope.

In addition, the present invention may be carried out such that the peak portion of at least any one of the reaction flow path and the second flow path has length (a) in the axial-direction so that a cross-section area of the flow path is increased as compared to the case where the peak portion has no length (a) in the axial-direction.

In addition, the present invention may be carried out such that there is a plurality of the concentric spaces formed between the inner tube and the outer tube that are concentrically arranged.

In addition, the present invention may be carried out such that at least any one of a passing flow path including the reaction flow path, through which the fluid to be reacted flows, and a passing flow path including the second flow path, through which the heat medium flows, is coated with a corrosion resistant material, and it is preferable that the coating with the corrosion resistant material be one of a glass lining, a fluorine resin coating, and a ceramic coating.

Advantages

The present invention could provide the flow reactor that can facilitate a reaction process of a fluid to be reacted under an appropriate temperature control, namely in the state that the temperature of the fluid to be reacted is controlled.

The present invention could provide the flow reactor that can facilitate a reaction thereby reducing a reaction time.

The present invention could provide the flow reactor that has a structure suitable for suppressing retention of a fluid to be reacted or a generated gas in a heat transfer portion.

The present invention could provide the flow reactor having a good washability.

The present invention could provide the flow reactor having a structure t that can be easily decomposable.

The present invention could also provide the flow reactor to which can apply coating or lining.

To describe more specifically, in the processes for manufacturing chemicals and pharmaceutical products as well as in the reaction processes of a tonner, an inkjet, and the like, there are many requirements such as those for rapid cooling and rapid heating, precise temperature control, and the like. The object, namely the fluid to be reacted, includes a lot of a highly viscous liquid, a slurry containing microparticles, and adhering substances. In the case that a heating operation accompanied with evaporation is conducted in the reaction process, when a generated gas retains, the thermal conductivity thereof drops to the almost same low level as the single-phase flow of the generated gas. This phenomenon is called a dry-out phenomenon in which a liquid film flowing along the heat transfer surface disappears by evaporation thereby causing a gas phase thereof by directly contacting with the heat transfer surface. In addition, the flow reactor must be scaled up without fail; thus, not only a high performance, but also it must be processed as calculated even when the size thereof is large.

In order to solve these problems, the relationship between the flow rate of the fluid to be reacted and the pressure loss was reconsidered; and as a result, the present invention could provide the flow reactor having the structure that even if the flow rate of the fluid to be reacted is increased, the pressure loss does not become too large. This effect is large especially when the fluid to be reacted is a highly viscous liquid or the slurry that readily precipitates, which results in decrease of dirt and adhesion.

In addition, by making the cross-sectional shape of the heat transfer surface a substantially triangle, the retention of liquid and the generated gas does not exist, and the heat transfer area can be made large. Accordingly, there is a flexibility of design that the substantially triangle is selected as the cross-sectional shape of the heat transfer body from the physical properties of the fluid to be reacted.

In addition, because the held amount of the fluid to be reacted is small, heating or cooling can be rapidly handled, and at the same time the held amount of the heating medium or cooling medium is also small, reduction in the size of the equipment, improvement in the performance, and easy control could be realized.

In addition, in the flow field of the fluid to be reacted, by controlling the flow rate thereof, a turbulent flow and a laminar flow can be freely determined; thus, in the flow path of a heat medium or a cooling medium, the turbulent flow can be significantly increased as the Reynolds number. Accordingly, the overall heat transfer coefficient is increased, so that the reaction rate can be significantly increased.

Since the structure of the flow reactor is very simple and easy to disassemble and assemble, this can be coated or lined with a corrosion resistant material.

BEST MODES FOR CARRYING OUT THE INVENTION

Hereinafter, with reference to the drawings, a flow reactor according to each of the embodiments of the present invention will be described. In this specification, the center lines described in FIG. 2 and FIG. 4A to FIG. 4F indicate the axial direction.
(Fluid)

In the embodiments, the fluid that contains a substance to be reacted will be explained as a reaction fluid F1. When the reaction fluid F1 is composed of, for example, two fluids, each fluid will be explained as a reaction fluid F1(A) and a reaction fluid F1(B), respectively; and when these two fluids are merged, the fluid after being merged will be explained as the reaction fluid F1. Hereinafter, the reaction fluid F1 is composed of one fluid, or when the fluid is composed of two or more fluids, the reaction fluid F1 is referred to the fluid after being merged in which the two or more fluids are merged. A heat medium that undergoes a heat exchange with the reaction fluid F1 will be explained as a second fluid F2. Further, another heat medium that undergoes a heat exchange with the reaction fluid F1 will be explained as a third fluid F3.

Illustrative examples of the reaction fluid F1 may include various fluids such as a gas, a liquid, a slurry, and a highly viscous liquid. Illustrative examples of the second fluid F2 and the third fluid F3 may include heat media for heating such as a steam and a hot water, although a heat media for cooling may be used as well.

Outline of the First Embodiment

Figure 1:
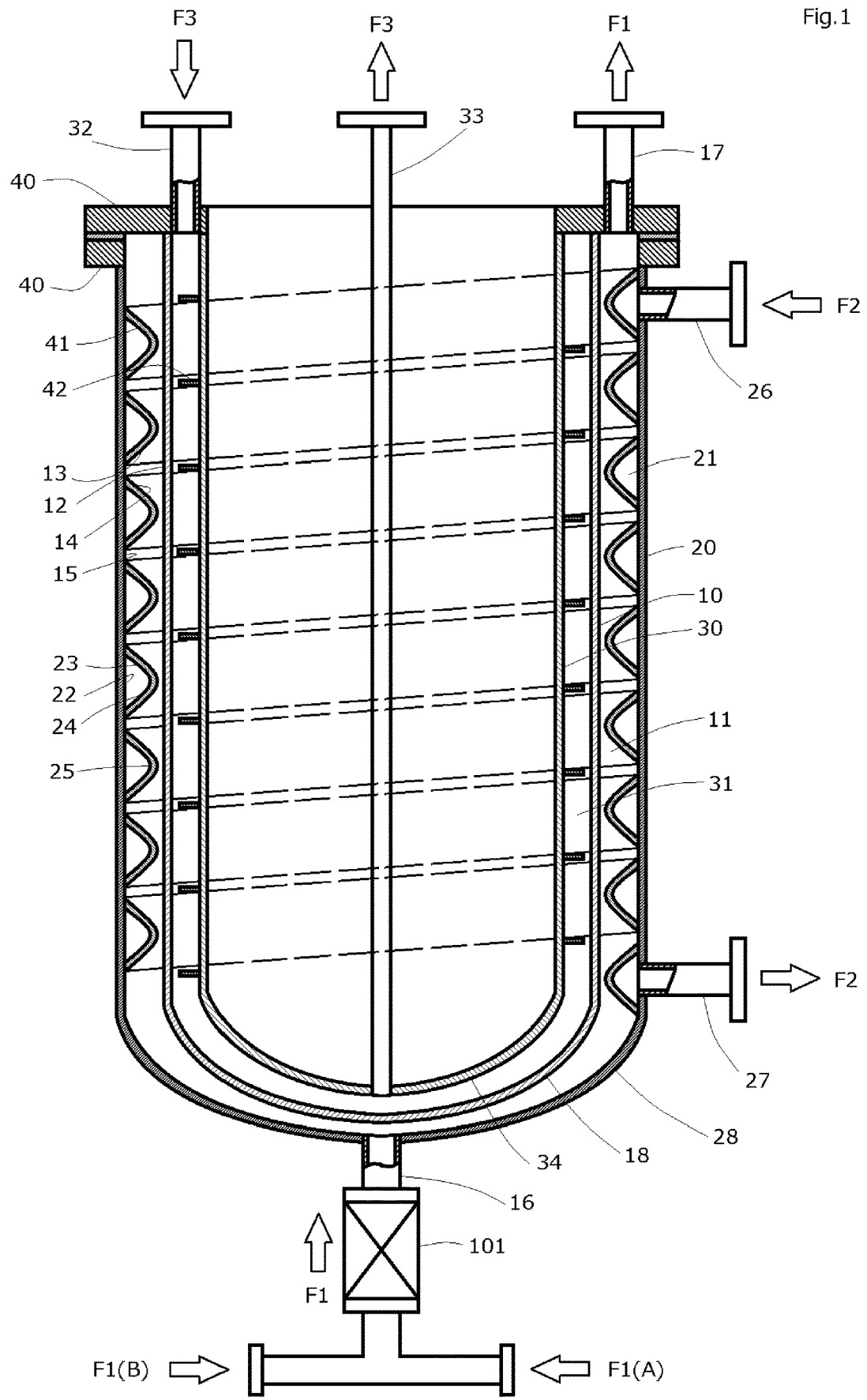
FIG. 1 is a cross-sectional view in vertical direction of a flow reactor according to a first embodiment of the present invention.

The flow reactor according to the first embodiment as shown in FIG. 1 includes an inner tube 10 and an outer tube 20 that are concentrically arranged, and as needed, with a third cylinder 30 that is concentrically arranged further inside of the inner tube 10.

A heat transfer body 41 is arranged on the inner peripheral surface of the outer tube 20 so as to be spirally circulated.

A space between the inner tube 10 and the outer tube 20 is partitioned into two spaces by the heat transfer body 41. Of the two spaces thus partitioned, the space in the inner side (inner side in the radius direction) of the heat transfer body 41 constitutes a reaction flow path 11, which is the flow path of the reaction fluid F1; and of the two spaces thus partitioned, the space in the outer side (outer side in the radius direction) of the heat transfer body 41 constitutes a second flow path 21, which is the flow path of the second fluid F2.

The heat transfer body 41 is fixed to the inner peripheral surface of the outer tube 20 by welding or the like in the state of maintaining an air tightness and a liquid tightness, accordingly, the space between the inner tube 10 and the outer tube 20 is partitioned into the reaction flow path 11 and the second flow path 21 so as not to mix the reaction fluid F1 and the second fluid F2; and the reaction flow path 11 and the second flow path 21 become the spirally circulated flow paths. The heat exchange is performed between the reaction fluid F1 and the second fluid F2 via the heat transfer body 41.

Figure 2:
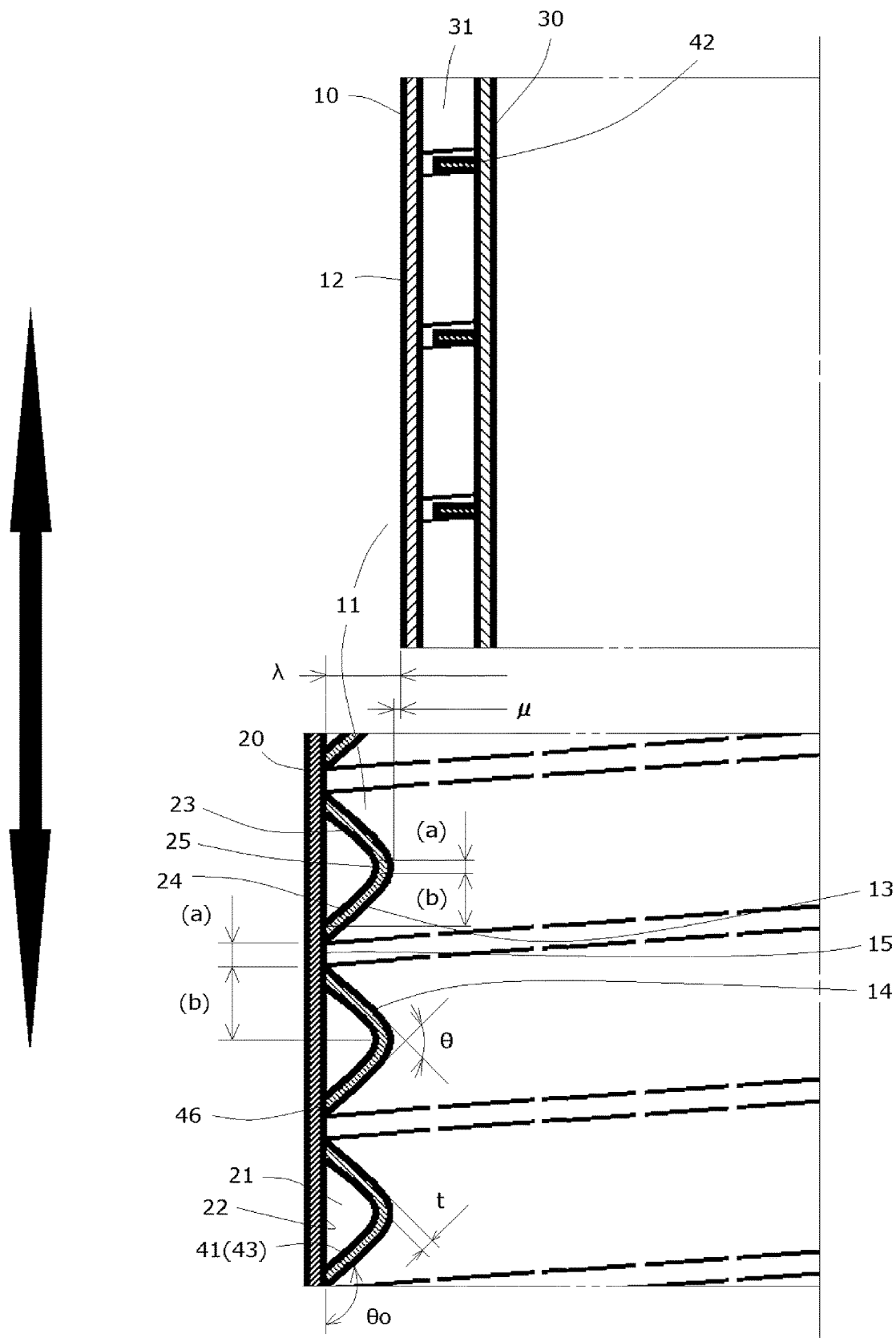
FIG. 2 is an enlarged cross-sectional view of the essential part in the state that an inner tube and an outer tube in FIG. 1 are separated.

The inner tube 10 and the outer tube 20 are assembled detachably; and as shown in FIG. 2, under the state of being separated, the heat transfer body 41 is separated together with the outer tube 20 from the inner tube 10. Under this separated state, a flow path constitution surface that defines the reaction flow path 11 is separated into the side of the inner tube 10 and the side of the outer tube 20.

Further, in this example, the space between the inner tube 10 and the third cylinder 30 constitutes a third flow path 31 for the third fluid F3; and a heat exchange is performed between the reaction fluid F1 and the third fluid F3 via the inner tube 10. In this configuration, since a flow path body 42 is spirally circulated and is fixed to the outer peripheral surface of the third cylinder 30, the third flow path 31 also becomes a spirally circulated flow path.
(Fixing and Separation of Cylinders)

The inner tube 10, the outer tube 20, and the third cylinder 30 are fixed by a flange portion 40 at an upper end of the cylinders so as to be separable from each other. In this example, two flange portions 40 are overlapped with a sealing member sandwiched therebetween and, they are detachably assembled and integrated by a detachable fixing member such as a bolt (not shown). The upper ends of the inner tube 10 and the third cylinder 30 are fixed (detachably, as necessary) to the upper flange portion 40, and the upper end of the outer tube 20 is fixed (detachably, as necessary) to the lower flange portion 40; by separating the upper and lower flange portions 40 and 40, the inner tube 10 and the outer tube 20 can be separated from each other. In addition, at least any one of the inner tube 10 and the third cylinder 30 is made detachable from the upper flange portion 40, whereby the inner tube 10 and the third cylinder 30 can also be separated from each other.

As described above, the heat transfer body 41 is fixed to the inner peripheral surface of the outer tube 20 by welding or the like. Accordingly, when the heat exchanger is taken apart by disassembling the fixing of the flange portion 40, this is separated into the outer tube 20 in which the heat transfer body 41 is fixed to the inner peripheral surface thereof, the inner tube 10, and the third cylinder 30 having the flow path body 42 in the outer peripheral surface thereof. At this time, the outer tube 20 to which the heat transfer body 41 is attached can be pulled out downward together with the lower flange portion 40 because there is no interference against the heat transfer body 41.

(With Regard to the Heat Transfer Body 41)

The heat transfer body 41 advances in the axial direction between the inner tube 10 and the outer tube 20 while spirally circulating, therefore the cross-sectional shape thereof in the axial-direction cross-sectional view is a substantially triangle, as shown in FIG. 1 and FIG. 2. In this embodiment, the heat transfer body 41 is fixed to the inner peripheral surface of the outer tube 20 by welding or the like.

As the apex angle $\theta$ of the substantially triangle in the axial-direction cross-sectional view of the heat transfer body 41 increases, the cross-section areas (flow path areas) of the reaction flow path 11 and the second flow path 21 increase, while the number of the spiral circulation per the certain length unit in the inner tube 10 and the outer tube 20 in the axial direction decreases. Also, as the apex angle $\theta$ departs more from 90 degrees, the narrow portions in the reaction flow path 11 and the second flow path 21 increase, so that risk of clogging the fluid increase. Therefore, considering these aspects, the apex angle $\theta$ is appropriately in the range of 30 degrees or more to 125 degrees or less.

On the other hand, the exterior angle (360−$\theta$) to the apex angle $\theta$ of the substantially triangle is 90 degrees or greater, while appropriately in the range of 235 degrees or more to 330 degrees or less.

In the mathematical sense, the triangle has two hypotenuses intersect with each other at the apex; but when presupposing the industrial production thereof such as processing of a metal plate, in general, the apex thereof is rounded, or has an axial-direction length of the cross-sectional shape thereof. Therefore, it must be understood that the term "substantially triangle" includes not only the mathematical triangle but also the shapes with presupposition of industrial production thereof. Accordingly, it must be understood that the apex angle $\theta$ of the substantially triangle means not only the intersection point of the two hypotenuses but also the intersection points of the extended lines thereof. In the case of the cross-sectional shape having the axial-direction length, as the axial-direction length increases, the risk that the reaction fluid F1 is clogged between the heat transfer body 41 and the outer peripheral surface of the inner tube body 10 increases; the axial-direction length is appropriately shorter than the axial-direction length of one hypotenuse.

Because the heat exchange is performed between the reaction fluid F1 and the second fluid F2 via the heat transfer body 41, in view of the efficiency of the heat exchange, the thickness t of the heat transfer body 41 is preferably in the range of 0.2 mm to 3 mm, while more preferably in the range of 0.5 mm to 2 mm. The thicknesses of the inner tube 10, the outer tube 20, and the third cylinder 30 may be the same as the above-mentioned thickness. Here, however, the thicknesses thereof are not limited to this range; they may be modified in view of the strength in which the inner tube 10, the outer tube 20, and the third cylinder 30 work as the structural body.

The heat transfer body 41 may also be said which is composed of a sterically shaped portion 43 having at least one bending portion (this includes not only the portion in which a straight line is bent with an angle but also the portion that is curved like an arc). The sterically shaped portion 43 has at least one bending portion and has the shape capable of forming the spaces (the reaction flow path 11 and the second flow path 21) in which fluids can be flowed in both the inner surface side and the outer surface side thereof. Specifically, the sterically shaped portion 43 is a long body having the shape like a polygonal square tube or a tube divided along the axial direction thereof; in this example, the sterically shaped portion 43 is a long body having the shape like the one that a square tube is divided on the diagonal line of its square cross section along the axial direction. The sterically shaped portion 43 is wounded around the inner peripheral surface of the outer tube 20, and upper and lower end sides 46 thereof are fixed to the inner peripheral surface of the outer tube 20. The exterior angle $\theta_0$ formed by the sterically shaped portion 43 and the inner peripheral surface of the outer tube 20 in each of the upper and lower end sides 46 is appropriately 90 degrees or greater, while more preferably $105 \leq \theta_0 \leq 160$. Here, when the sterically shaped portion 43 in the end sides 46 is curved, the angle is formed by the tangential lines thereof and the inner peripheral surface of the outer tube 20.

The exterior angle of the bending portion in the sterically shaped portion 43 means the exterior angle (360−$\theta$) to the apex angle $\theta$ of the substantially triangle and the exterior angle $\theta_0$ formed by the sterically shaped portion 43 and the inner peripheral surface of the outer tube 20 in each of the upper and lower end sides 46.

(With Regard to the Reaction Flow Path 11)

The reaction flow path 11 constitutes the flow path having the cross-sectional shape of the substantially triangle and is the space between the heat transfer body 41 that is spirally circulated on the inner peripheral surface of the outer tube 20 and the outer peripheral surface of the inner tube 10; and the reaction flow path 11 is the flow path of the reaction fluid F1, which is the main subject to perform heat exchange.

The reaction flow path 11 is defined by a bottom surface 12 formed by the outer peripheral surface of the inner tube 10, two slopes of a first slope 13 and a second slope 14, and a peak portion 15 formed between the first slope 13 and the second slope 14. The peak portion 15 is composed of the inner peripheral surface of the outer tube 20, and this portion is the space between the spiral circulations of the heat transfer body 41 in the axial direction. Here, when the heat transfer body 41 is made dense spiral shape so as not to generate a space in the axial direction, the peak portion 15 becomes a dotty peak point having no length in the axial-direction cross sectional shape.

In this embodiment, the inner tube 10 is a circular cylindrical body in the axial-direction cross-sectional view; and the outer peripheral surface thereof is a cylindrical outer peripheral surface without unevenness. Further, in this example, the outer tube 20 is also a circular cylindrical body in the axial-direction cross-sectional view; and the inner peripheral surface thereof is a cylindrical inner peripheral surface without evenness.

When the axial-direction length (a) of the peak portion 15 is increased, the cross-section area (flow path area) of the reaction flow path 11 can be increased, however, since the area of the heat transfer body 41 directly related to the heat exchange does not change even when the length (a) is increased, there is a risk that the entire heat transfer efficiency thereof decreases. Therefore, it is preferable that the axial-direction length (a) of the peak portion 15 be shorter than the axial-direction length (b) of the slope 13 and the slope 14.

The first slope 13 and the second slope 14 are appropriately linear in the axial-direction cross sectional view, but they may be curved lines such as an arch shape or the like. However, it is preferable that the flow paths having substantially triangular cross-sectional shape (the reaction flow path 11 and the second flow path 21) have the shape in which the fluids to be processed, i.e., the reaction fluid F1 and the second fluid F2, or a gas is unlikely to accumulate. For example, it is preferable to avoid providing a flat horizontal portion or a depression portion in a part of the flow path unless there is a special purpose.

In this example, as shown in FIG. 2, the heat transfer body is provided with a gap ($\mu$) which is provided in the base portion side of the substantially triangle in the axial-direction cross-sectional view that constitutes the reaction flow path 11. In other words, a space is provided between the end portion in the inner peripheral side of the first slope 13 and the bottom surface 12, and a space is provided between the end portion in the inner peripheral side of the second slope 14 and the bottom surface 12. It may be carried out without providing this gap ($\mu$), but when the gap ($\mu$) is provided, it is appropriate to set it to 4 mm or less. In still other words, in the spirally circulated first flow path 11, the gap ($\mu$) is provided between circulations adjacent to each other in the axial direction, namely, between the substantially triangular cross-sectional shape and the substantially triangular cross-sectional shape which are adjacent to each other in the axial direction. It may be carried out without providing this gap ($\mu$), but when the gap ($\mu$) is provided, it is appropriate to set it to 4 mm or less.

By providing this gap ($\mu$), the outer tube 20 and the inner tube 10 can be readily separated upon disassembling the heat exchanger. When the gap is too large, however, the amount of the fluid in which the reaction fluid F1 does not spirally flow but flows in a short pass in the axial direction increases, so that the efficiency of the heat exchange may be decreased.

It can be understood that the gap ($\mu$) is the maximum flow path width ($\mu$) of the reaction flow path 11 in the radius direction, and that the length between the peak portion 15 and a bottom portion 18 of the reaction flow path 11 defines the maximum flow path width ($\lambda$) of the reaction flow path 11 in the radius direction. Here, the ratio ($\lambda/\mu$) of the maximum flow path width ($\lambda$) to the minimum flow path width ($\mu$) of the reaction flow path 11 is appropriately 2 or more, while preferably 10 or more. When there is no gap $\mu$ (in other words, when the heat transfer body 41 and the inner tube 10 are in contact with each other), this means $\mu=0$, i.e., $\lambda/\mu=\infty$.

Note that explanation about the heat transfer body 41 such as the apex angle $\theta$ of the substantially triangle in the axial-direction cross-sectional view is also applied to the reaction flow path 11.

It is expected that various fluids such as a gas, a liquid, a slurry, and a highly viscous liquid flow in the reaction flow path 11 as the reaction fluid F1. At this time, depending on the type of the fluid, a highly viscous substance or a slurry easily precipitate may adhere to the reaction flow path 11. In this embodiment, however, since the first reaction path 11 has the substantially triangle shape in the axial-direction cross-sectional view and has no narrow portion that has a dead end, so that the reaction flow path 11 has the structure such that the generation of adhesion of a highly viscous substance or a slurry easily precipitate can be suppressed.

Also, upon disassembling for cleaning, when the inner tube 10 and the outer tube 20 are separated, not only the outer peripheral surface of the inner tube 10 is exposed, but also the entire heat transfer body 41 having the substantially triangular cross-sectional shape in the axial-direction is exposed together with the inner peripheral surface of the outer tube 20.

In other words, the flow path constitution surface defining the reaction flow path 11 is, in the side of the outer tube 20, the inner peripheral surface of the outer tube 20 in the radius direction and the surface of the inner side of the heat transfer body 41 in the radius direction, and in the side of the inner tube 10, the outer peripheral surface of the inner tube 10. Therefore, all surfaces thereof are configured so as to be directly exposed without being hidden by any other portion viewed from the radius direction, which is perpendicular to the axial direction.

Accordingly, not only the reaction flow path 11 can be cleaned in every corner, but also it is easy to confirm the state after completion of the cleaning thereof. On the other hand, in the shell-and-tube reactor described in Patent Document 1, not only the cleaning is difficult but also it is not easy to confirm the cleaning state.

The material of each surface that defines the flow path of the reaction fluid F1 such as the reaction flow path 11 may be selected in accordance with the types of the reaction fluid F1 such as metal. In addition, it is preferable that the surface thereof be coated with a corrosion resistant material. Illustrative examples of the coating with a corrosion resistant material include a glass lining, a fluorine resin coating, and a ceramic coating. At this time, after the heat transfer body 41 is fixed to the inner peripheral surface of the outer tube 20 by welding or the like, when this is coated with a corrosion resistant material as well as the outer peripheral surface of the inner tube 10 is similarly coated, and then, the inner tube 10 is inserted into the outer tube 20 for assemble, the entire inner surface of the reaction flow path 11, i.e., the entire flow path constitution surface that defines the reaction flow path 11 can be reliably coated.

(With Regard to the Second Flow Path 21)

The space outside of the heat transfer body 41 in the radius direction (in other words, the space between the heat transfer body 41 and the inner peripheral surface of the outer tube 20) constitutes the second flow path 21 having the substantially triangular cross-sectional shape in the axial-direction. The second flow path 21 is defined by a bottom surface 22 composed of the inner peripheral surface of the outer tube 20, two slopes of a first slope 23 and a second slope 24, and a peak portion 25 between the first slope 23 and the second slope 24. The peak portion 25 may be a dot-like apex having no length in the vertical-direction cross sectional shape, or may be a linear or curved peak portion having a length in the axial-direction cross sectional shape. When the peak portion 25 is the linear or curved peak portion having a length in the axial direction cross-sectional shape, it is preferable that an axial-direction length (a) of the peak portion 25 be shorter than an axial-direction length (b) of the slopes 23 and 24. It is appropriate that the first slope 23 and the second slope 24 are linear in the axial-direction cross sectional view; but each of them may be a curved line such as an arch shape.

Note that, explanation about the apex angle θ of the substantially triangle in the axial-direction cross-sectional view and so forth of the heat transfer body 41 is also applied to the second flow path 21.

Contrary to the reaction flow path 11, the second flow path 21 is a closed space in the axial-direction cross-sectional view, so that when the inner tube 10 and the outer tube 20 are only separated, the closed state is maintained. However, since a heat medium such as a steam, a hot water, a cold water, and a nitrogen gas is passed through the second flow path 21 as the second fluid F2, the adhesion of the fluid or the like barely occurs on contrary to the reaction flow path 11.

A plate-like flow path body 42 extending spirally is fixed to the outer peripheral surface of the third cylinder 30 by welding or the like, whereby the third flow path 31 becomes a spiral space. The circulation direction of the third flow path 31 may be the same as the circulation direction of the reaction flow path 11 and the second flow path 21, or may be different (for example, clockwise or counterclockwise direction).

In the third flow path 31, unless the inner tube 10 and the third cylinder 30 are separated, the enclosed state thereof is maintained. However, since a heat medium such as a steam, a hot water, a cold water, and a nitrogen gas is passed through the third flow path 31 as the third fluid F3, the adhesion of the fluid or the like barely occurs on contrary to the reaction flow path 11.

The inner tube 10, the outer tube 20, and the third cylinder 30 each are provided with the bottom portion 18, a bottom portion 28, and a bottom portion 34, respectively; these portions having a dome-like shape. The space between the bottom portion 18 of the inner tube 10 and the bottom portion 28 of the outer tube 20 is connected to a lower portion of the spiral reaction flow path 11, and the space between the bottom portion 18 of the inner tube 10 and the bottom portion of the third cylinder 30 is connected to a lower portion of the spiral third flow path 31.

The lower end of the reaction flow path 11 in FIG. 1 is connected to an outer flow path via the inlet portion 16. In this example, the inlet portion 16 is provided such that a T-type connecting pipe is attached to a penetrating hole that is open to the bottom portion 28 of the outer tube 20. The T-type connecting pipe is composed of a merging portion where a branch pipe and a branch pipe are merged. As shown in FIG. 1, a mixer 101 such as a static mixer and various continuous mixer may be arranged in the merging portion of the T-type connecting pipe. The upper end of the reaction flow path 11 is connected to an outer flow path via the outlet portion 17. In this example, the outlet portion 17 is provided such that a connecting pipe is attached to a penetrating hole that is open to the flange portion 40. The reaction fluids F1(A) and F1(B) are respectively introduced from the branch pipes of the T-type connecting pipe that constitutes the inlet portion 16, and they are merged into one flow path at the merging portion; then, the reaction fluid F1 after being merged flows into the spiral reaction flow path 11 and moves upward while spirally circulating, and then flows out to outside through the outlet portion 17.

The upper end of the second flow path 21 is connected to an outer flow path via an inflow portion 26. In this example, the inflow portion 26 is provided such that a connecting pipe is attached to a penetrating hole that is open to the outer tube 20. The lower end of the second flow path 21 is connected to an outer flow path via an outflow portion 27. In this example, the outflow portion 27 is provided such that a connecting pipe is attached to a penetrating hole that is open to the outer tube 20. The second fluid F2 flows from the inflow portion 26 into the spiral second flow path 21 and moves spirally downward, and then flows out to outside through the outflow portion 27.

The upper end of the third flow path 31 is connected to an outer flow path via an inflow portion 32. In this example, the inflow portion 32 is provided such that a connecting pipe is attached to a penetrating hole that is open to the flange portion 40. The lower end of the third flow path 31 is connected to an outer flow path via an outflow portion 33. In this example, the outflow portion 33 is provided such that a connecting pipe is attached to a penetrating hole that is open to the center of the bottom portion 34. Here, this connecting pipe is extended in a cylindrical space inside of the third cylinder 30 until its position in the axial direction becomes substantially the same height as the outflow portion 17 of the reaction flow path 11 and the inflow portion 26 of the second flow path 21. The third fluid F3 flows from the inflow portion 32 into the spiral third flow path 31 and spirally moves downward, and then flows out to outside through the outflow portion 33.

Note that, upon carrying out this embodiment, the inflow portion and the outflow portion of each flow path may be reversed.

The material of each surface that defines the flow paths of the second fluid F2 and the third fluid F3 such as the second flow path 21 and the third flow path 31 may be selected in accordance with the types of the second fluid F2 and the third fluid F3 such as metal. In addition, it is preferable that the surface thereof be coated with a corrosion resistant material. Illustrative examples of the coating with a corrosion resistant material may include a glass lining, a fluorine resin coating, and a ceramic coating.

Second Embodiment

Figure 3:
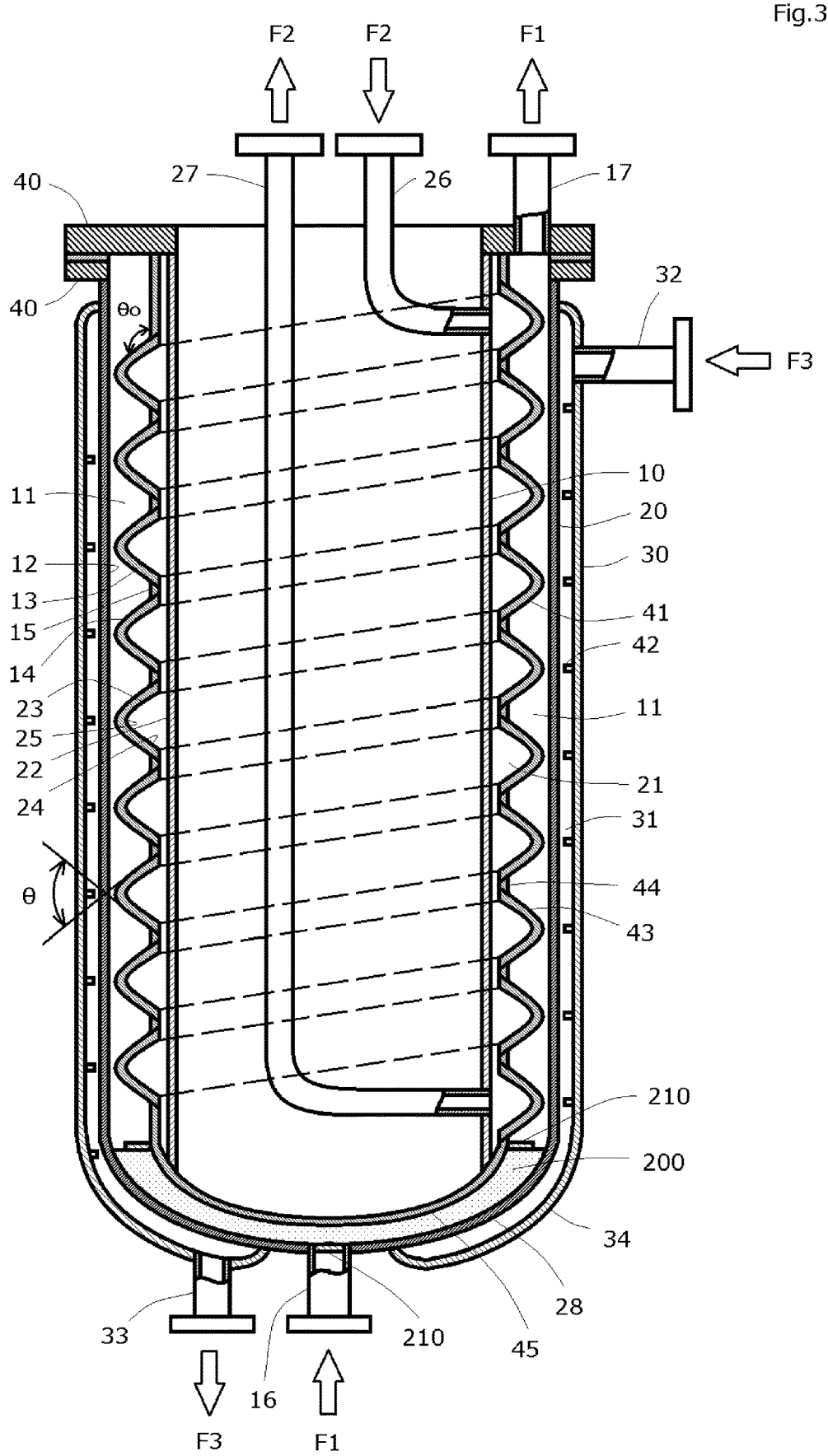
FIG. 3 is a cross-sectional view in vertical direction of a flow reactor according to a second embodiment of the present invention.

FIG. 3 shows an axial-direction cross-sectional view of a flow reactor according to a second embodiment. The flow reactor according to this embodiment is different from the flow reactor according to the first embodiment in that the third cylinder 30 is arranged outside of the outer tube 20. In the following description, the different points will be mainly explained, and the explanation to the first embodiment is applied to the matters not explained below.

In the flow reactor according to the second embodiment, three tubes of the inner tube 10, the outer tube 20, and the third cylinder 30 are concentrically arranged toward the outer side in the radius direction. The upper ends of the inner tube 10 and the heat transfer body 41 are attached (detachably as necessary) to the upper flange 40, and the upper end of the outer tube 20 is attached (detachably as necessary) to the lower flange 40; both the flange portions 40 and 40 are joined to each other so as to be separatable and decomposable into the upper and the lower portions. The upper end of the third cylinder 30 is joined to the outer peripheral surface near the upper end side of the outer tube 20 by welding or the like; and the lower end of the third cylinder 30 is joined to the outer peripheral surface of the bottom portion 28 of the outer tube 20 by welding or the like.

The space in the inner surface side of the heat transfer body 41, in other words, the space between the heat transfer body 41 and the inner tube 10, constitutes the second flow path 21; the space in the outer surface side of the heat transfer body 41, in other words, the space between the heat transfer body 41 and the outer tube 20, constitutes the reaction flow path 11; and the space between the outer tube 20 and the third cylinder 30 constitutes the third flow path 31.

In the heat transfer body 41, the sterically shaped portions 43 having the cross-sectional shape of the substantially triangle in the axial-direction cross-sectional view are connected to each other and are integrated via a flat-plate like cylindrical portion 44. In other words, the heat transfer body 41 has also cylindrical shape as a whole, and the shape of cylindrical wall surface has an uneven shape including the sterically shaped portion 43 and the flat portion 44, and the sterically shaped portion 43 and the flat portion 44 advances in the axial direction while spirally circulating.

(With Regard to Each Flow Path)

The reaction flow path 11 is defined by the bottom surface 12 that is composed of the inner peripheral surface of the outer tube 20, the two slopes of the first slope 13 and the second slope 14, and the peak portion 15 between the first slope 13 and the second slope 14. The peak portion 15 is composed of the flat portion 44, and the peak portion 15 is a linear peak portion having a length in the axial-direction cross sectional shape, but this may also be a dot-like apex having no length.

The second flow path 21 is defined by the bottom surface 22 that is composed of the outer peripheral surface of the inner tube 10, the two slopes of the first slope 23 and the second slope 24, and the peak portion 25 between the first slope 23 and the second slope 24. The peak portion 25 may be a dot-like apex having no length in the axial-direction cross sectional shape, or may be a linear peak portion having a length.

A plate-like flow path body 42 extending spirally is fixed to the inner peripheral surface of the third cylinder 30 by welding or the like, whereby the third flow path 31 becomes a spiral space. The circulation direction of the third flow path 31 may be the same as the circulation direction of the reaction flow path 11 and the second flow path 21, or may be different (for example, clockwise or counterclockwise direction).

(With Regard to the Inflow Portion and the Outflow Portion)

The outer tube 20, the third cylinder 30, and the heat transfer body 41 each have the bottom portion 28, the bottom portion 34, and a bottom portion 45, respectively; these portions having a dome-like shape. On the other hand, the inner tube 10 does not have such a dome-like bottom portion, and the bottom end thereof is fixed to the inner surface side of the bottom portion 45 of the heat transfer body 41 by welding or the like.

In the first flow path 11, the lower end thereof is connected to an outer flow path via the inflow portion 16. In this example, the inflow portion 16 is provided such that a connecting pipe is attached to a penetrating hole that is open to the bottom portion 28 of the outer tube 20.

(With Regard to the Inflow Portion and the Outflow Portion)

In addition, as shown in FIG. 3, a catalyst 200 for reaction may be arranged in the dome-like bottom portion together with a catalyst-holding plate 201. In this case, there is also an effect that the operation such as exchange of the catalyst 200 for reaction is easy. In addition, the catalyst-holding plate 201 prevents the catalyst 200 for reaction from flowing out.

The upper end of the reaction flow path 11 is connected to an outer flow path via the inflow portion 17. In this example, the inflow portion 17 is provided such that a connecting pipe is attached to a penetrating hole that is open to the flange portion 40. The first fluid F1 flows from the inflow portion 16 into the spiral reaction flow path 11 and moves spirally upward, and then flows out to outside through the outflow portion 17.

In the second flow path 21, the upper end thereof is connected to an outer flow path via the inflow portion 26. In this example, the inflow portion 26 is provided such that a connecting pipe having an L-shaped bending portion is attached to a penetrating hole that is open to the inner wall surface near the upper end side of the inner tube 10. The lower end of the second flow path 21 is connected to an outer flow path via the outflow portion 27. In this example, the outflow portion 27 is provided such that a connecting pipe having an L-shaped bending portion is attached to a penetrating hole that is open to the inner wall surface in the lower end side of the inner tube 10. Here, this connecting pipe having the bending portion is extended in a cylindrical space inside of the inner tube 10 until its position in the axial direction becomes substantially the same height as the inflow portion 26.

The second fluid F2 flows from the inflow portion 26 into the spiral second flow path 21 and moves downward while spirally circulating, and then flows out to outside through the outflow portion 27.

Next, in the third flow path 31, the upper end thereof is connected to an outer flow path via the inflow portion 32. In this example, the inflow portion 32 is provided such that a connecting pipe is attached to a penetrating hole that is open to the outer peripheral surface in the upper end side of the third cylinder 30. The lower end of the third flow path 31 is connected to an outer flow path via the outflow portion 33. In this example, the outflow portion 33 is provided such that a connecting pipe is attached to a penetrating hole that is open to the bottom portion 34 in the lower end side of the third cylinder 30. The third fluid F3 flows from the inflow portion 32 into the spiral third flow path 31 and moves downward spirally, and then flows out to outside through the outflow portion 33.

Note that, upon carrying out this embodiment, the inflow portion and the outflow portion of each flow path may be reversed.

(Separation of Cylinders)

When the heat exchanger is disassembled by releasing the joining made by means of the detachable joining members (not shown) such as the bolts of the upper and lower flange portions 40 and 40, this can be separated into the outer tube 20 to which the third cylinder 30 is joined, the inner tube 10, and the heat transfer body 41, so that the outer tube 20 to which the third cylinder 30 is joined can be pulled out to downward as shown in drawing together with the lower flange portion 40 in the drawing. By so doing, the reaction flow path 11 becomes the state of being separated into the inside and the outside thereof; and thus, the flow path constitution surface that defines the reaction flow path 11 is separated into the side of the inner tube 10 and the side of the outer tube 20. The flow path constitution surface that defines the reaction flow path 11 is the inner peripheral surface of the outer tube 20 on the side of the outer tube 20 and is the surface of the outer side of the heat transfer body 41 in the radius direction on the side of the inner tube 10. All of these surfaces are configured so as to be directly exposed without being hidden by any other portion when viewed from the radius direction that is perpendicular to the axial direction. Accordingly, similarly to the first embodiment, the reaction flow path 11 becomes in the state where cleaning is extremely easy.

In the first embodiment, the exterior angle $\theta_O$ was the angle formed by the sterically shaped portion 43 and the outer tube 20; but in this embodiment, the exterior angle $\theta_O$ is the angle formed by the sterically shaped portion 43 and the flat portion 44. In either case, since the exterior angle $\theta_O$ is an obtuse angle of 90 degrees or greater, in the separated state, they are released to the state where there is no narrow portion; therefore, not only the cleaning of the reaction flow path 11 can be done extremely easy, but also the cleaning state can be readily confirmed.

Figure 4:
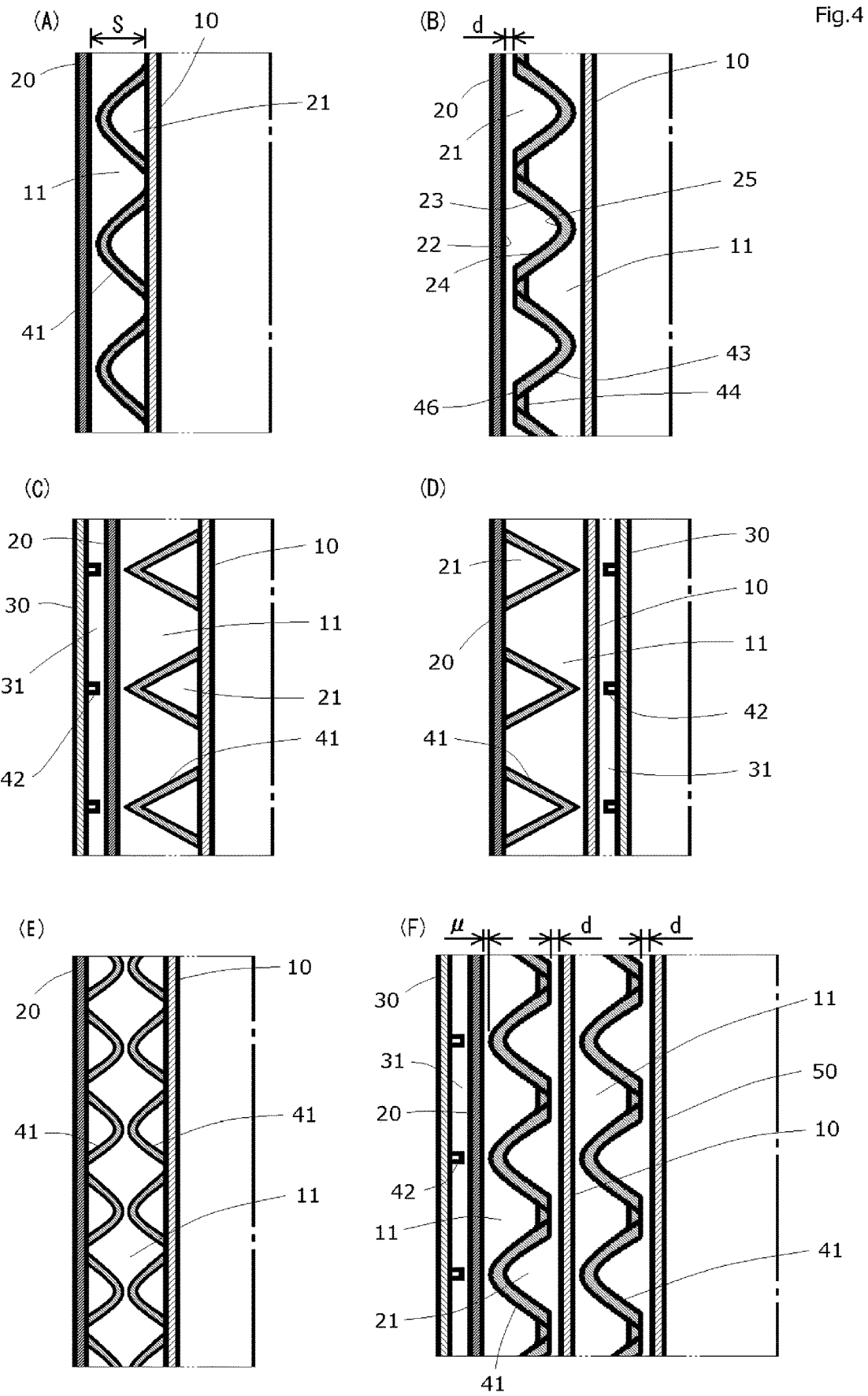
FIG. 4A to FIG. 4F each are a cross-sectional view in vertical direction of the essential part showing the modification examples of the flow reactor according to the respective embodiments of the present invention.

(With Regard to FIG. 4)

The present invention may be carried out with various modification in addition to the above-mentioned embodiments. These modified examples will be explained with reference to FIG. 4.

The heat transfer body 41 may be arranged on the outer peripheral surface of the inner tube 10 as shown in FIG. 4A, or may be arranged on the inner peripheral surface of the outer tube 20 as shown in FIG. 4B. In addition, the heat transfer body 41 may be configured such that the sterically shaped portion 43 is fixed to the peripheral surface of the cylinder without providing the flat portion 44, or may be provided with the sterically shaped portion 43 and the flat portion 44 to form cylindrical shape as a whole.

As shown in FIG. 4A, a radius-direction width S in the space between the inner tube 10 and the outer tube 20 is preferably in the range of 4 mm to 75 mm, while more preferably in the range of 10 mm to 50 mm.

It may be said that FIG. 4B is a modification example of the second embodiment. In the second embodiment, the peak portion 25 of the heat transfer body 41 faces the outer peripheral surface of the inner tube 10; on the other hand, in this modification example, the peak portion 25 of the heat transfer body 41 faces the inner peripheral surface of the outer tube 20. In this example, a gap (d) is formed between the outer peripheral surface of the flat portion 44 of the heat transfer body 41 and the inner peripheral surface of the outer tube 20; in other words, a space is formed between the end side 46 of the sterically shaped portion 43 and the inner peripheral surface of the outer tube 20. The embodiment may be carried out without such a gap (d); but it is appropriate that the gap (d) is 3 mm or less. In still other words, the gap (d) is formed between the circulations adjacent to each other in the axial direction in the spirally circulating second flow path, namely between the cross-sectional shape of the substantially triangle and the cross-sectional shape of the substantially triangle that are adjacent to each other in the axial direction. It may be carried out without providing such a gap (d); but when the gap (d) is provided, it is appropriate 3 mm or less in the radius direction. By forming this gap (d), while the second flow path 21 can be enlarged; when the gap is too large, the amount of the second fluid F2 that does not spirally flow but flows in a short pass in the axial direction increases, so that the efficiency of the heat exchange may be decreased.

Next, the third cylinder 30 may be arranged in the outer side of the outer tube 20 and fixed thereto as shown in FIG. 4C, or may be arranged in the inner side of the inner tube 10 and fixed thereto as shown in FIG. 4D, or only the reaction flow path 11 and the second flow path 21 may be arranged without providing a third cylinder 30.

As shown in FIG. 4E, two sets of the heat transfer bodies 41 may be used. In this case, it can show that one heat transfer body 41 is fixed to the outer peripheral surface of the inner tube 10, and the other heat transfer body 41 is fixed to the inner peripheral surface of the outer tube 20. When the space between the two sets of the heat transfer bodies 41 and 41 constitute the reaction flow path 11 through which the reaction fluid F1 flows, upon separating the inner tube 10 from the outer tube 20, the reaction flow path 11 becomes the state of being separated into two portions of the inside and the outside, so that the flow path constitution surface that defines the reaction flow path 11 is separated into the side of the inner tube 10 and the side of the outer tube 20. In the flow path constitution surface that defines the reaction flow path 11, the side of the outer tube 10 is the surface of the inner side of the heat transfer body 41 in the radius direction, and the side of the inner tube 20 is the surface of the outer side of the heat transfer body 41 in the radius direction. These surfaces are configured so as to be directly exposed without being hidden by any other portion when viewed from the radius direction that is perpendicular to the axial direction.

The space between the one heat transfer body 41 and the inner tube 10 and the space between the other heat transfer body 41 and the outer tube 20 constitute the second flow path and the third flow path, respectively. In FIG. 4E, the two sets of the heat transfer bodies 41 are arranged such that the peak portions of the substantially triangles in the axial-direction cross-sectional view face each other; although the pitches of both sides may be shifted.

FIG. 4F shows the modification example of the second embodiment. Here, a fourth cylinder 50 is concentrically arranged further inside of the inner tube 10, and the heat transfer body 41 may be arranged in the space between the inner tube 10 and the fourth cylinder 50, therefore, a plurality of the heat transfer bodies 41 can be arranged. In the inner tube 10 and the fourth cylinder 50 concentrically thus arranged, when viewed from a relation of the inside and outside in the radius direction, the inner tube 10 is arranged in the outer side of the fourth cylinder 50, and the fourth cylinder 50 is arranged in the inner side of the inner tube 10, thus the inner tube 10 corresponds to the outer tube 20, and the fourth cylinder 50 corresponds to the inner tube 10. Accordingly, in FIG. 4F, there are concentrically two spaces formed between the inner tube 10 and the outer tube 20 which are concentrically arranged, as the result, a plurality of the spaces formed between the inner tube and outer tube which are concentrically arranged may be arranged concentrically.

As described above, in any of the examples, the side of the inner tube 10 and the side of the outer tube 20 have a configuration that can be assembled such that they can be separated only by moving in the axial direction (upward and downward directions) without rotating; and here, the heat transfer body 41 has the size not intervening other portions when moving in the axial direction (upward and downward directions). Specifically, in the case of the inner tube 10 and the outer tube 20 having a constant circular cylindrical shape with the radius, when the heat transfer body 41 is fixed to the side of the inner tube 10, the maximum outer diameter of the heat transfer body 41 is set so as to be smaller than the inner diameter of the outer tube 20. Also, when the heat transfer body 41 is fixed to the side of the outer tube 20, the minimum inner diameter of the heat transfer body 41 is set so as to be larger than the outer diameter of the outer tube 20. In addition, the present invention may also be carried out as a substantially cone shape whose radius changes as the inner tube 10 and the outer tube 20 move in the axial direction. In this case, assuming that the inner tube 10 can be separated from the outer tube 20 by moving this upward in the drawing, when the heat transfer body 41 is fixed to the side of the inner tube 10, the maximum outer diameter of the heat transfer body 41 in each cross section that is perpendicular to the axial direction is set so as to be smaller than the inner diameter of the outer tube 20 that is above the cross section. When the heat transfer body 41 is fixed to the side of the outer tube 20, the minimum inner diameter of the heat transfer body 41 in each cross section that is perpendicular to the axial direction is set so as to be larger than the outer diameter of the inner tube 20 that is above the cross section.

REFERENCE NUMERALS

F1 Reaction fluid
F2 Second fluid
F3 Third fluid
10 Inner tube
11 Reaction flow path
12 Bottom surface
13 First slope
14 Second slope
15 Peak portion
16 Inflow portion
17 Outflow portion
18 Bottom portion
20 Outer tube
21 Second flow path
22 Bottom surface
23 First slope
24 Second slope
25 Peak portion
26 Inflow portion
27 Outflow portion
28 Bottom portion
30 Third cylinder
31 Third flow path
32 Inflow portion
33 Outflow portion
34 Bottom portion
40 Flange portion
41 Heat transfer body
42 Flow path body
43 Sterically shaped portion
44 Flat portion
45 Bottom portion
λ Maximum flow path width of the reaction flow path
μ Gap (minimum flow path width of the reaction flow path)
d Gap

The invention claimed is:

1. A flow reactor comprising a reaction flow path, the reaction flow path being circulated spirally to flow a fluid to be reacted, wherein
   a heat transfer body is arranged in a space formed between an inner tube and an outer tube that are arranged concentrically, and
   at least any one of the inner tube and the outer tube is a cylinder having a circular shape in an axial-direction cross sectional-view, wherein
   the heat transfer body is spirally circulated and has a cross sectional shape of a substantially triangle in an axial-direction cross sectional-view,
   the space is partitioned into the reaction flow path and a second flow path by the heat transfer body, and a heat exchange is performed between the fluid to be reacted flowing in the reaction flow path and a heat medium flowing in the second flow path via the heat transfer body, and
   a ratio ($\lambda/\mu$) of a maximum flow path width ($\lambda$) of the reaction flow path to a minimum flow path width ($\mu$) of the reaction flow path in a radius direction is 2 or more ($2 \leq \lambda/\mu < \infty$).

2. The flow reactor according to claim 1, wherein the reaction flow path is not provided with a horizontal portion capable of accumulating the fluid to be reacted.

3. The flow reactor according to claim 1, wherein the reaction flow path and the second flow path are spirally circulated, respectively, and a gap is not formed between circulations adjacent to each other in an axial direction, or a gap of 4 mm or less is formed in a radial direction.

4. The flow reactor according to claim 1, wherein
   cross sectional shapes of the reaction flow path and the second flow path in an axial-direction cross-sectional view is a substantially triangle whose apex angle θ is in the range of 30 degrees or more to 125 degrees or less.

5. The flow reactor according to claim 1, wherein
   the side of the inner tube and the side of the outer tube are assembled so as to be separatable only by moving in an axial direction without rotating, and the heat transfer body is configured so as not to interfere with other portion upon moving in the axial direction.

6. The flow reactor according to claim 1, wherein
   cross sectional shapes of the reaction flow path and the second flow path in an axial-direction cross-sectional view is a substantially triangle having two slopes, a bottom surface, and a peak portion; and an axial-direction length (a) of the peak portion is shorter than an axial-direction length (b) of the slopes.

7. The flow reactor according to claim 6, wherein
   the peak portion of at least any one of the reaction flow path and the second flow path has the axial-direction length (a) so that a cross-section area of the flow path is increased as compared with the case where the peak portion is the apex having no axial-direction length (a).

8. The flow reactor according to claim 1, wherein
   a plurality of spaces is concentrically formed between the inner tube and the outer tube that are concentrically arranged.

9. The flow reactor according to claim 1, wherein
   at least any one of a passing flow path through which the reaction fluid flows, including the reaction flow path, and a passing flow path through which the heat medium flows, including the second flow path, is coated with a corrosion resistant material.

10. The flow reactor according to claim 9, wherein
    the coating with the corrosion resistant material is one of a glass lining, a fluorine resin coating, and a ceramic coating.

11. The flow reactor according to claim 2, wherein the reaction flow path and the second flow path are spirally circulated, respectively, and a gap is not formed between circulations adjacent to each other in an axial direction, or a gap of 4 mm or less is formed in a radial direction.

12. The flow reactor according to claim 2, wherein
    cross sectional shapes of the reaction flow path and the second flow path in an axial-direction cross-sectional view is a substantially triangle whose apex angle θ is in the range of 30 degrees or more to 125 degrees or less.

13. A flow reactor comprising a reaction flow path, the reaction flow path being circulated spirally to flow a fluid to be reacted, wherein a heat transfer body that is spirally circulated is arranged in a space formed between an inner tube and an outer tube that are arranged concentrically, and the flow reactor is configured such that the space is partitioned into the reaction flow path and a second flow path by the heat transfer body, and that a heat exchange is performed between the fluid to be reacted flowing in the reaction flow path and a heat medium flowing in the second flow path via the heat transfer body, wherein the inner tube, the outer tube, and the heat transfer body are assembled so as to be separable into a side of the outer tube and a side of the inner tube, in the state of being separated into the side of the outer tube and the side of the inner tube, a flow path constitution surface that defines the reaction flow path is separated into the side of the outer tube and the side of the inner tube, and whole surfaces of the flow path constitution surfaces that define the reaction flow path are configured so as to be directly exposed without being hidden by any other portion when viewed from a radius direction perpendicular to an axial direction, wherein the reaction flow path is a path which spirally circulates, and a ratio ($\lambda/\mu$) of a maximum flow path width ($\lambda$) of the reaction flow path to a minimum flow path width ($\mu$) of the reaction flow path in a radius direction is 2 or more ($2 \leq \lambda/\mu < \infty$).

14. The flow reactor according to claim 13, wherein the heat transfer body is fixed to any one side of the outer tube and the inner tube and is not fixed to other side of the outer tube and the inner tube, the heat transfer body is provided with a sterically shaped portion that has at least one bending portion and can form a space through which the fluids flow in both an inner surface side and an outer surface side thereof, wherein an exterior angle of all bending portions appearing on the flow path constitution surface that defines the reaction flow path is 90 degrees or greater.

15. The flow reactor according to claim 13, wherein the reaction flow path is not provided with a horizontal portion capable of accumulating the fluid to be reacted.

16. The flow reactor according to claim 14, wherein the reaction flow path is not provided with a horizontal portion capable of accumulating the fluid to be reacted.

17. The flow reactor according to claim 13, wherein the reaction flow path and the second flow path are spirally circulated, respectively, and a gap is not formed between circulations adjacent to each other in an axial direction, or a gap of 4 mm or less is formed in a radial direction.

18. The flow reactor according to claim 14, wherein the reaction flow path and the second flow path are spirally circulated, respectively, and a gap is not formed between circulations adjacent to each other in an axial direction, or a gap of 4 mm or less is formed in a radial direction.

19. The flow reactor according to claim 13, wherein cross sectional shapes of the reaction flow path and the second flow path in an axial-direction cross-sectional view is a substantially triangle whose apex angle $\theta$ is in the range of 30 degrees or more to 125 degrees or less.

20. The flow reactor according to claim 14, wherein cross sectional shapes of the reaction flow path and the second flow path in an axial-direction cross-sectional view is a substantially triangle whose apex angle $\theta$ is in the range of 30 degrees or more to 125 degrees or less.

* * * * *